United States Patent
Siryy et al.

(10) Patent No.: US 11,418,958 B1
(45) Date of Patent: Aug. 16, 2022

(54) SUBSCRIBER IDENTITY MODULE (SIM) REMOTE UPDATE AGENT

(71) Applicant: T-MOBILE INNOVATIONS LLC, Overland Park, KS (US)

(72) Inventors: Maksym Siryy, Louisburg, KS (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 303 days.

(21) Appl. No.: 16/653,966

(22) Filed: Oct. 15, 2019

(51) Int. Cl.
| | | |
|---|---|---|
| *H04W 12/40* | (2021.01) | |
| *H04W 8/22* | (2009.01) | |
| *H04L 41/0816* | (2022.01) | |
| *H04W 12/06* | (2021.01) | |
| *H04W 12/08* | (2021.01) | |
| *H04W 88/02* | (2009.01) | |
| *H04W 12/47* | (2021.01) | |

(52) U.S. Cl.
CPC ......... *H04W 12/40* (2021.01); *H04L 41/0816* (2013.01); *H04W 8/22* (2013.01); *H04W 12/06* (2013.01); *H04W 12/08* (2013.01); *H04W 12/47* (2021.01); *H04W 88/02* (2013.01)

(58) Field of Classification Search
CPC ........... H04W 8/22; H04W 4/50; H04W 4/60; H04W 24/06; H04W 92/08; H04W 4/24; H04W 8/205; H04W 12/06; H04Q 7/20; H04Q 7/32; G01S 19/48; G01S 5/0036; H04L 41/147; H04L 12/2854; H04L 63/0853; H04M 1/24; H04M 17/026; H04M 17/00; G06F 11/3688; G07F 7/02; G07F 7/082; G07F 7/1025; G07F 7/0886; G07F 7/1008; G06Q 20/322; G06Q 20/3433; G06Q 20/06; G06Q 20/12; G06Q 20/32; G06Q 20/3226; G06Q 20/341; G06Q 20/04; G06Q 20/425; G06K 7/10881; G06K 7/0004; H04B 1/3816
See application file for complete search history.

(56) References Cited

U.S. PATENT DOCUMENTS

7,280,847 B2 * 10/2007 Goldthwaite ............. G07F 7/02
455/558
9,357,378 B1 * 5/2016 Delker .................... H04W 4/50
(Continued)

*Primary Examiner* — Thanhnga B Truong (57) ABSTRACT

A subscriber identity module (SIM). The SIM comprises a processor, a non-transitory memory storing a configuration file, a wireless identity, a wireless access key, and a remote update agent stored in the non-transitory memory. When executed by the processor, the remote update agent determines that the SIM is communicatively coupled to a wireless communication network via a radio transceiver of a communication device with which the SIM is associated, in response to determining that the SIM is communicatively coupled to the wireless communication network, sends a provide local information (PLI) command to the mobile communication device to acquire network measurement results (NMR) based on the configuration file, transmits NMR data via the radio transceiver using a bearer independent protocol (BIP), receives SIM update information via the radio transceiver, and stores the SIM update information in the configuration file in the non-transitory memory.

20 Claims, 7 Drawing Sheets

(56) References Cited

U.S. PATENT DOCUMENTS

| | | | | |
|---|---|---|---|---|
| 2007/0207798 A1* | 9/2007 | Talozi | ............... | H04W 24/06 455/423 |
| 2008/0139219 A1* | 6/2008 | Boeiro | ............... | G01S 19/48 455/456.2 |

* cited by examiner

SUBSCRIBER IDENTITY MODULE (SIM) REMOTE UPDATE AGENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A subscriber identity module (SIM) may be used by a mobile communication device to store wireless communication network access credentials and other unique identifying information. When the mobile communication device attempts to attach to a radio access network (RAN), for example by establishing a wireless communication link with a cell site, a radio modem of the mobile communication device may request the access credentials and identity information from the SIM and present these items to the RAN for authentication and authorization to attach to the RAN. SIMs comprise non-transitory memory as well as a processor. The non-transitory memory may store the access credentials and unique identifying information. The non-transitory memory may store branding information associated with a mobile communication service provider. The non-transitory memory may store contact information, such as telephone numbers and associated names. A SIM may be embodied in a variety of different forms. A SIM may be embodied as a smart card. A SIM may be removably installed into a mobile communication device. A SIM may be semi-permanently installed onto a circuit board of a mobile communication device (e.g., not typically removable by a lay person without damaging the mobile communication device).

SUMMARY

In an embodiment, a subscriber identity module (SIM) is disclosed. The SIM comprises a processor, a non-transitory memory storing a configuration file and wireless identity access keys, and a remote update agent stored in the non-transitory memory. When executed by the processor, the remote update agent determines that the SIM is communicatively coupled to a wireless communication network via a radio transceiver of a mobile communication device with which the SIM is associated, in response to determining that the SIM is communicatively coupled to the wireless communication network, sends a provide local information (PLI) command to the mobile communication device to acquire network measurement results (NMR) based on the configuration file, transmits NMR data via the radio transceiver using a bearer independent protocol (BIP), receives SIM update information via the radio transceiver, and stores the SIM update information in the configuration file in the non-transitory memory.

In another embodiment, a method of updating a subscriber identity module (SIM) installed in a mobile communication device is disclosed. In an embodiment, the method comprises determining by a remote update agent executing on a SIM that the SIM is communicatively coupled to a wireless communication network via a radio transceiver of a mobile communication device with which the SIM is associated, and, in response to determining that the SIM is communicatively coupled to the wireless communication network, sending a short message service (SMS) message by the remote update agent to a server computer to request a remote update. The method further comprises receiving by the remote update agent an updated configuration file from the server computer, storing the updated configuration file by the remote update agent in a non-transitory memory of the SIM, sending a provide local information (PLI) command to the mobile communication device to acquire network measurement results (NMR) identified by the updated configuration file, and transmitting the NMR by the remote update agent using a bearer independent protocol (BIP), where the NMR is packaged in a data field of the BIP message.

In yet another embodiment, a subscriber identity module (SIM) is disclosed. The SIM comprises a processor, a non-transitory memory storing a configuration file, a wireless identity, a wireless authentication key, and a remote update agent stored in the non-transitory memory. When executed by the processor, the remote update agent determines network measurement results (NMR) based on the configuration file, determines a terminal profile of a communication device with which the SIM is associated, determines location data, packages the NMR, terminal profile, and location data in a data blob, and transmits the data blob via the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A mobile communication device may have a subscriber identity module (SIM) that provides a variety of functions for the mobile communication device. The SIM comprises a non-transitory memory that may store identities and confidential keys that enable the mobile communication device to access and authenticate into a radio access network (RAN) and to attach to a cell site to receive a wireless communication link from the cell site. Some devices that are not mobile, for example statically located internet of things (IoT) devices, may have a SIM installed that provide identities and confidential keys that promote the devices authenticating into a RAN. The SIM may store a preferred roaming list (PRL) file or a public land mobile network (PLMN) file that identifies cell sites that the mobile communication device desirably attaches to and to avoid excessive roaming fees or failure of communication service. The SIM may store a user's contacts, such as phone numbers and addresses of acquaintances. The SIM comprises a processor that may execute commands invoked by the mobile communication device in which the SIM is installed.

Some SIMs are removably installed into a mobile communication device. A user may remove such a removable SIM from a first mobile communication device and install it into a second mobile communication device, and then use the second mobile communication device to obtain communication services based on the same wireless communication service account that formerly was associated to the first mobile communication device. Alternatively, some SIMs are semi-permanently installed onto a circuit board of a mobile communication device (e.g., not typically removable by a lay person without damaging the mobile communication device).

The present disclosure teaches systems and methods of updating the contents of a SIM. The wireless communication service provider may transmit new PRL files or PLMN files to a SIM, for example as roaming coverage agreements between the service provider and other wireless communication service providers change. In an embodiment, the SIM may collect data about the operation of the mobile communication device and periodically report this information back to the service provider. The wireless communication service provider may transmit an updated configuration file to the SIM that changes how the SIM reports data back to the service provider. For example, the updated configuration file may identify additional data to be collected or less data to be collected. The updated configuration file may identify a different triggering event or periodic interval for the SIM reporting data back to the service provider. The updated configuration file may identify a different communication address to which the SIM is to report data back to the service provider. The updated configuration file may change branding information associated with the SIM and/or the device the SIM is installed in.

A SIM remote update agent is installed in the SIM. When the SIM is initially powered on, the SIM remote update agent checks to see if the device in which the SIM is installed is currently in wireless coverage. If the device is not in wireless coverage, the SIM remote update agent may wait until wireless coverage is established, thereby saving battery life of the device. In some cases the SIM remote update agent may be installed in a SIM in an IoT device that desirably conserves its battery life.

When the device is in wireless coverage, the SIM remote update agent may transmit a short message service (SMS) message to a SIM update server application in a core network of a wireless communication service provider requesting to be informed of any pending updates. The server computer may then push an update to the SIM via the wireless communication link. By employing a so-called SMS pull operation in this way, the SIM remote update agent can overcome a problem with the more conventional SMS push operation where a central server pushes an SMS message to a device, but the device is not powered up, having powered down to preserve its battery life, for example when the device is an IoT device. The central server may attempt to resend the SMS push message, but the device may never receive it because it may only turn on intermittently and for short durations of time to preserve battery life. The SMS pull operation of the SIM remote update agent obviates this problem. The ability of the SIM remote update agent to get through to the server to find updates may be particularly useful when wireless communication service providers change coverage capabilities or a subscription account affiliation associated with the device changes. For example, an IoT device that has been moved to a different service provider may incur needless roaming costs by continuing to attach to the "old" service provider network to which the IoT device now appears as a roaming device due to the change of the subscription account. By enabling timely SIM updates, the SIM remote update agent can avert these undesirable roaming charges.

In an embodiment, the SIM may communicate with the server using a bearer independent protocol (BIP). The BIP is able to determine what communication links to a network are available to the device in which the SIM is installed and adapt itself to use that available communication link. The server may push the update to the SIM using BIP, for example in an internet protocol (IP) message. The update may be provided in a data field of the BIP message. As an example, the server may transmit a PRL update that comprises between 14 Kilobytes (kB) and 18 kB of data. If this PRL update were transmitted via SMS messages, which may be limited to about 100 bytes of data, such an update may entail receiving about 160 SMS messages and piecing them together to form the complete PRL update file. For a device in a marginal coverage area, receiving this many SMS messages reliably without losing one of the messages may be challenging.

The SIM remote update agent may also be configured to collect information and provide this information back to the server on a triggering event and/or based on a periodic interval. The information may comprise a profile of the device in which the SIM is installed. For example, the information may comprise a profile of a mobile communication device or an IoT device. The profile may comprise an identity of the device comprising one or more of a phone number such as a mobile directory number (MDN) or Microsoft Developer Network (MSDN), a carrier identity, a network identity, a model of device, a hardware version identity of device, and/or a software version identity of device. The collected information may comprise location data such as an identity of a current serving cell site (e.g., a known location of the identified cell site may be used as a proxy for the location of the device). The collected information may comprise network measurement results (NMR), for example a current radio signal to noise ratio (SNR) and a radio timing advance. The time advance information may be used to infer a distance of the device from a cell site or from a wireless access point. If the device the SIM is associated with has a GPS receiver, the collected information may comprise a set of current global positioning system (GPS) coordinates. In an embodiment, the SIM remote update agent packages the collected information into a data field or data blob and transmits the packaged information in a single message to the server. In some circumstances, a wireless communication service provider may not have control or access to information on a mobile communication device, for example because the device may be privately owned. By providing the ability to collect information by the SIM, the service provider may be able to collect information that otherwise would be unavailable to the service provider.

The SIM remote update agent taught herein may be relatively small. For example, the SIM remote update agent code may be stored in about 12 kB to 16 kB of memory in the SIM, in about 10 kB to 12 kB of memory in the SIM, in about 8 kB to 10 kB of memory in the SIM, or in about 6 kB to 8 kB of memory in the SIM. In an embodiment, the SIM remote update agent is less than 10 kB of memory. A SIM remote update agent that consumes less space in the SIM can allow deployment of a less expensive SIM, which when multiplied by tens of millions of devices per year can total to significant annual savings by a wireless communication service provider. An alternative embodiment involved two separate remote update agents stored in the SIM that were stored in about 25 kB of memory. In part the two separate remote update agents consumed more space because they comprised one or more duplicated code passages. The single SIM remote update agent taught herein avoids this undesirable duplication of code passages that consumes additional memory in the SIM. Additionally, these two separate remote update agents were designed to wait three minutes before attempting to communicate with the server. But some IoT devices do not turn on for at least three minutes before powering down again, because they are conserving battery power. These two separate remote update agents also did not check first to determine if the device was in wireless coverage before executing, and so they were disposed to wasting battery power when the device was not in wireless coverage.

The SIM remote update agent taught herein supports two additional triggering mechanisms (the first was triggering on a power-on event of the SIM)—triggering based on receipt of a SMS point-to-point message from the server and triggering based on a user input via a user interface of the device. The device may receive an SMS message from the server computer that identifies an address from which the SMS remote update agent is to retrieve an updated configuration file. An interface of the device the SIM is installed in may promote a user prompting the SIM remote update agent to reach out to the server to retrieve an update. For example, a user of a mobile communication device may call customer care about a problem, and the customer care facility may advise the user to manually prompt the mobile communication device to reach out to the server to pull down an updated configuration file, for example to pull down an updated PRL.

Figure 1:
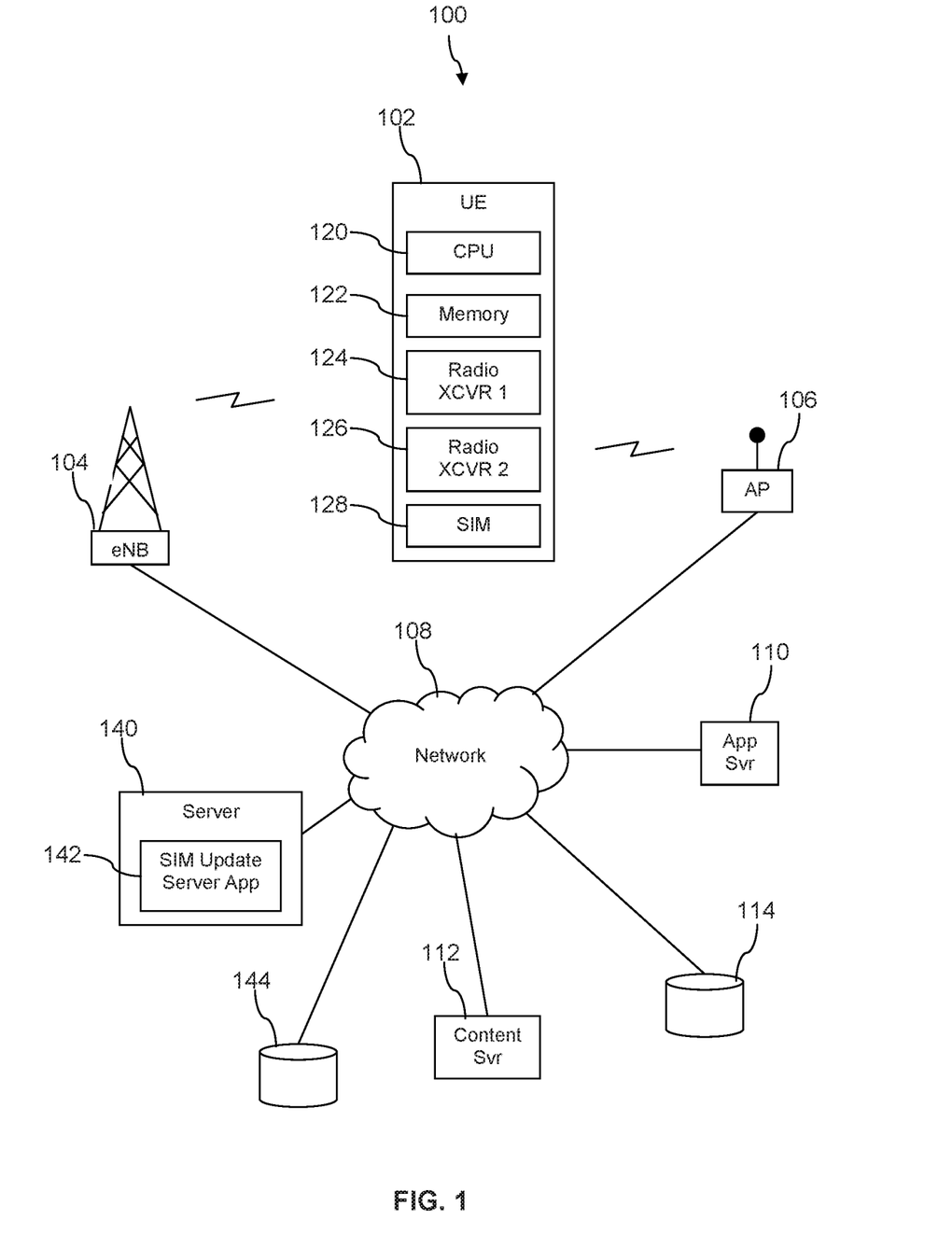
FIG. 1 is a block diagram of a communication system according to an embodiment of the disclosure.

Turning now to FIG. 1, a communication system 100 is described. In an embodiment, the system 100 comprises a user equipment (UE) 102, a cell site 104, a wireless access point (AP) 106, a network 108, an application server 110, a content server 112, and a content data store 114. The UE 102 may be a mobile communication device such as a mobile phone, a personal digital assistant, a smart phone, a wearable computer, a headset computer, a laptop computer, a tablet computer, or a notebook computer. The UE 102 may be an internet of things (IoT) device. The network 108 may be one or more public networks, one or more private networks, or a combination thereof. In an embodiment, the network 108 comprises the Internet.

In an embodiment, the UE 102 comprises a processor 120, a memory 122, a first radio transceiver 124, a second radio transceiver 126, and a subscriber identity module (SIM) 128. In an embodiment, the SIM 128 is removably installed in the UE 102. In another embodiment, the SIM 128 is semi-permanently installed in the UE 102 (e.g., not typically removable by a lay person without damaging the UE 102). In an embodiment, the UE 102 has only one radio transceiver 124. In another embodiment the UE 102 may have more than two radio transceivers 124, 126. In an embodiment, the UE 102 is able to establish a radio communication link via the first radio transceiver 124 with the cell site 104 according to a fifth generation (5G) protocol, a long term evolution (LTE) protocol, a code division multiple access (CDMA) protocol, a global system for mobile communications (GSM) protocol, or another wireless communication protocol. In an embodiment, the UE 102 may provide an identity and one or more confidential keys retrieved from a non-transitory memory of the SIM 128 for use by the UE 102 in authenticating into a radio access network (RAN), for example to obtain a radio link from the cell site 104.

In an embodiment, the UE 102 is able to establish a radio communication link via the second radio transceiver 126 with the AP 106 according to a WiFi protocol, a Bluetooth protocol, a near-field communication (NFC) protocol, or another short-range radio communication protocol. The UE 102 may communicate via the network 108 to the application server 110 and/or to the content server 112 and content data store 114. The application server 110 may support a game application, a navigation application, an enterprise application, or other application. The content server 112 and content data store 114 may support Internet surfing and research. It is understood that the system 100 may comprise any number of UEs 102, any number of cell sites 104, any number of APs 106, any number of application servers 110, any number of content servers 112, and any number of content data stores 114.

In an embodiment, the system 100 further comprises a server computer 140 that executes a SIM update server application 142. The SIM 128 may push a short message service (SMS) message to the SIM update server application 142 to request a pending SIM update. Alternatively, the SIM update server application 142 may send a SIM update SMS message to the SIM 128 prompting the SIM 128 to retrieve a SIM update from the SIM update server application 142 and/or a SIM configuration update data store 144.

Figure 2:
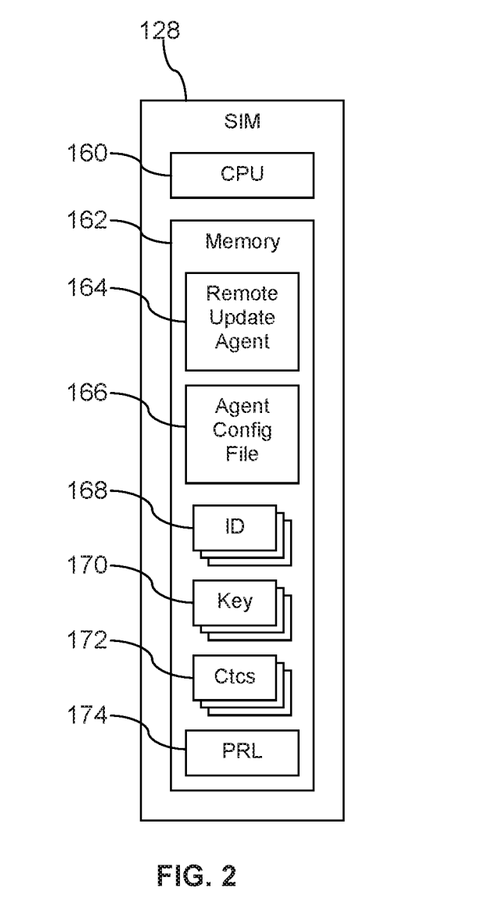
FIG. 2 is a block diagram of a subscriber identity module (SIM) according to an embodiment of the disclosure.

Turning now to FIG. 2, further details of the SIM 128 are described. In an embodiment, the SIM 128 comprises a processor 160 and a memory 162. In an embodiment, the memory 162 comprises a remote update agent 164, an agent configuration file 166, one or more identities 168, one or more confidential keys 170, one or more contacts 172, and a PRL 174. The identities 168 may comprise an integrated circuit card identifier (ICCID), a mobile directory number (MDN), an international mobile subscriber identity (IMSI), or other form of a phone number. The identities 168 may comprise an international mobile equipment identity (IMEI), a mobile equipment identity (MEID), or other electronic serial number (ESN). The keys 170 may comprise a wireless authentication key known as a Ki as well as other keys, for example keys used for encryption. The PRL 174 may comprise a list of preferred radio frequency bands, radio frequency sub-bands, and service provider identifiers and a priority order for scanning for these when establishing a connection to a cell site. The PRL 174 may be considered to define wireless coverage available to the UE 102 in which the SIM 128 is installed.

The agent configuration file 166 may comprise information that identifies what data the remote update agent 164 collects and when it will transmit this information to the SIM update server application 142. If the agent configuration file 166 is updated, for example if the remote update agent 164 receives an update to the agent configuration file 166, the data collected and transmitted by the agent 164 may change. In an embodiment, each time the remote update agent 164 executes it reads the agent configuration file 166 and continues executing based on configuration values stored in the agent configuration file 166.

Some of the data the agent 164 may collect and transmit comprises a profile of the UE 102, location data, network measurement results (NMR), and/or GPS location coordinates. The agent configuration file 166 may be changed to add to the list of information collected or to curtail the list of information collected. The agent configuration file 166 may identify that the information is collected and transmitted to the SIM update server application 142 on a periodic rate, and by updating the agent configuration file 166 the remote update agent 164 may change how often it collects and transmits information to the SIM update server application 142.

The remote update agent 164 may be triggered to collect and transmit data to the SIM update server application 142 in different ways. The remote update agent 164 may collect and transmit data when the SIM 128 is powered on (e.g., when the UE 102 is powered on). The remote update agent 164 may collect and transmit data when the SIM update server application 142 transmits a SMS message to the SIM 128 requesting data to be collected and transmitted by the remote update agent 164. The UE 102 may have a user interface that allows a user to prompt the remote update agent 164 to collect and transmit data. As part of the process of collecting and transmitting data, the remote update agent 164 may send a SMS to the SIM update server application 142 requesting to be informed of any pending updates. If an update for the SIM 128 is pending, the SIM update server application 142 may transmit an updated PRL 174 of an updated agent configuration file 166 to the remote update agent 164. In an embodiment, the SIM update server application 142 may transmit the PRL 174 or the updated configuration file 166 as a data blob in a data field of an Internet Protocol (IP) message to the SIM 128.

The remote update agent 164 may collect information from the UE 102 by invoking a provide local information (PLI) command on the UE 102, for example invoking the PLI command repeatedly, specifying a different parameter to be collected. In an embodiment, each time the remote update agent 164 invokes the PLI command during a periodic collection of information, the remote update agent 164 provides a different command qualifier value to the PLI command. For example, the remote update agent 164 may invoke the PLI command a first time with a command qualifier value indicating an IMEI, invoke the PLI command a second time with a command qualifier value indicating location information, invoke the PLI command a third time with a command qualifier value indicating timing advance, and invoke the PLI command a fourth time with a command qualifier of date, time, and time zone. As this information is collected incrementally by this sequence of PLI commands it is aggregated into a data field of a message. When all the information has been collected, the data is sent in the data field of a bearer independent protocol (BIP) message to the SIM update server application 142. The BIP message is provided by the SIM 128 to the UE 102, and one of the radio transceivers 124, 126 transmits the BIP message to the network 108, and the network 108 transmits the BIP message to the SIM update server application 142.

In an embodiment, the agent configuration file 166 may identify an address of the server 140 and/or the SIM update server application 142 to which to send the information collected by the remote update agent 164. In an embodiment, the SIM update server application 142 may push an SMS message to the remote update agent 164 that defines the address to which the remote update agent 164 is to send the collected information. In embodiment, the remote update agent 164 is not tied to a specific access point name (APN) and hence is able to transmit collected data to the SIM update server application 142 even when the UE 102 is roaming.

Figure 3:
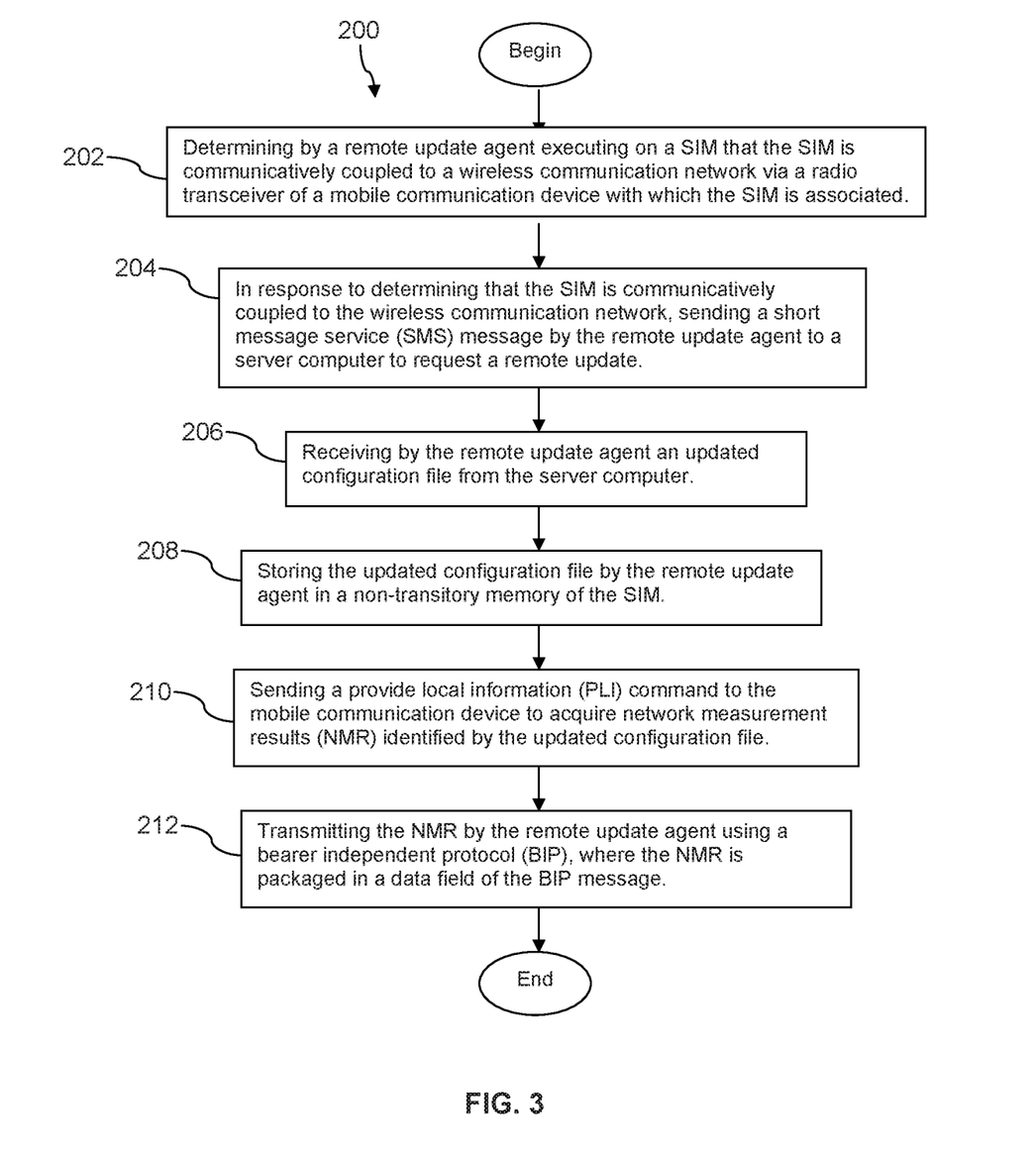
FIG. 3 is a flow chart of a method according to an embodiment of the disclosure.

Turning now to FIG. 3, a method 200 is described. In an embodiment, the method 200 is a method of updating a subscriber identity module (SIM) installed in a mobile communication device. At block 202, the method 200 comprises determining by a remote update agent executing on a SIM that the SIM is communicatively coupled to a wireless communication network via a radio transceiver of a mobile communication device with which the SIM is associated.

At block 204, the method 200 comprises, in response to determining that the SIM is communicatively coupled to the wireless communication network, sending a short message service (SMS) message by the remote update agent to a server computer to request a remote update. At block 206, the method 200 comprises receiving by the remote update agent an updated configuration file from the server computer.

At block 208, the method 200 comprises storing the updated configuration file by the remote update agent in a non-transitory memory of the SIM. At block 210, the method 200 comprises sending a provide local information (PLI) command to the mobile communication device to acquire network measurement results (NMR) identified by the updated configuration file. At block 212, the method 200 comprises transmitting the NMR by the remote update agent using a bearer independent protocol (BIP), where the NMR is packaged in a data field of the BIP message.

Figure 4:
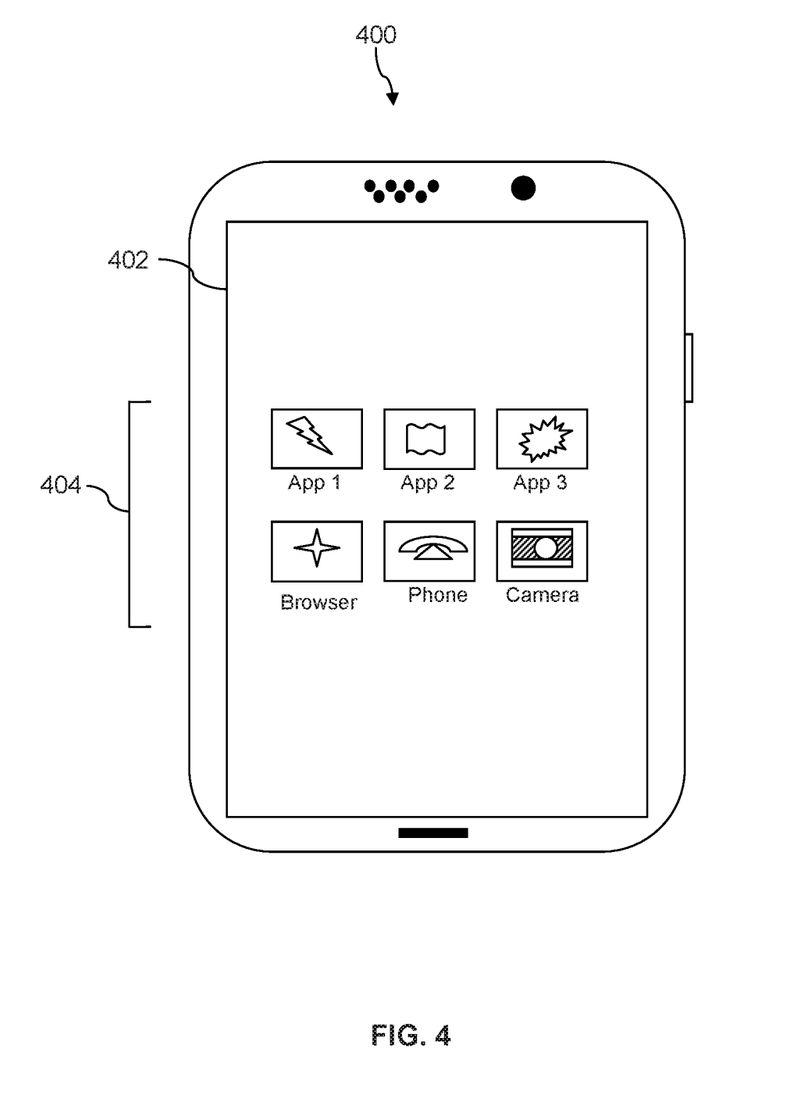
FIG. 4 is an illustration of a handset according to an embodiment of the disclosure.

FIG. 4 depicts the user equipment (UE) 400, which is operable for implementing aspects of the present disclosure, but the present disclosure should not be limited to these implementations. For example, some of the UEs 400 that have the SIM 128 installed in them may be handsets such as is illustrated in FIG. 4. Other UEs 400 that have the SIM 128 installed, however, are not embodied as handsets. In some cases, the UEs 400 that have the SIM 128 described herein installed may be internet of things (IoT) devices. Though illustrated as a mobile phone, the UE 400 may take various forms including a wireless handset, a pager, a personal digital assistant (PDA), a gaming device, or a media player. The UE 400 includes a touch screen display 402 having a touch-sensitive surface for input by a user. A small number of application icons 404 are illustrated within the touch screen display 402. It is understood that in different embodiments, any number of application icons 404 may be present in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
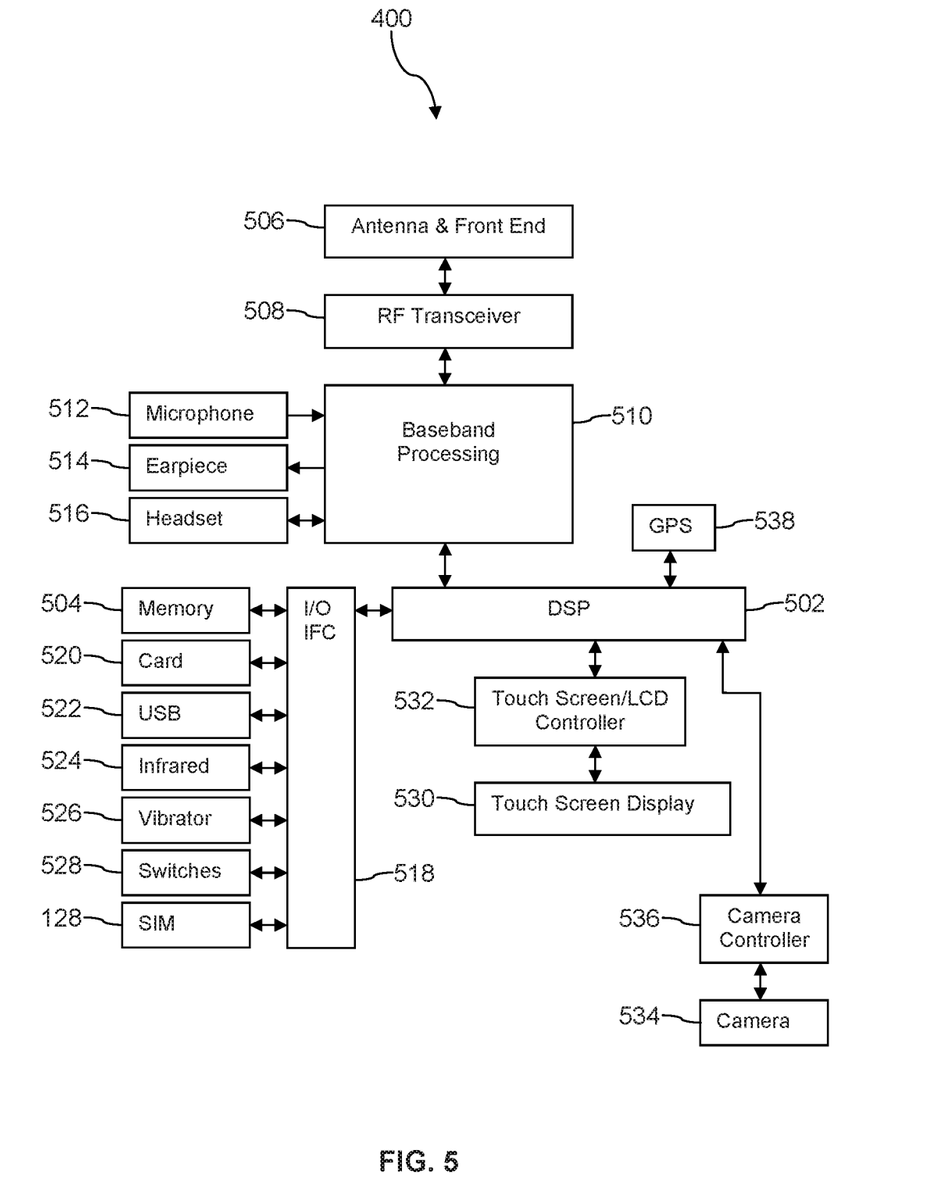
FIG. 5 is a block diagram of a hardware architecture of a mobile communication device according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, and the SIM 128. While the SIM 128 is shown coupled to the UE 400 via the input/output interface 518 in FIG. 5, in another embodiment the SIM 128 is coupled to the UE 400 in a different way, for example coupled to the baseband processing unit 510 and/or coupled to the RF transceiver 508. In an embodiment, the SIM 128 is removably coupled to the UE 400. In an alternative embodiment, the SIM 128 is semi-permanently installed into the UE 400, for example soldered to a circuit board holding some of the components shown in FIG. 5.

The UE 400 may further comprise a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and an additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
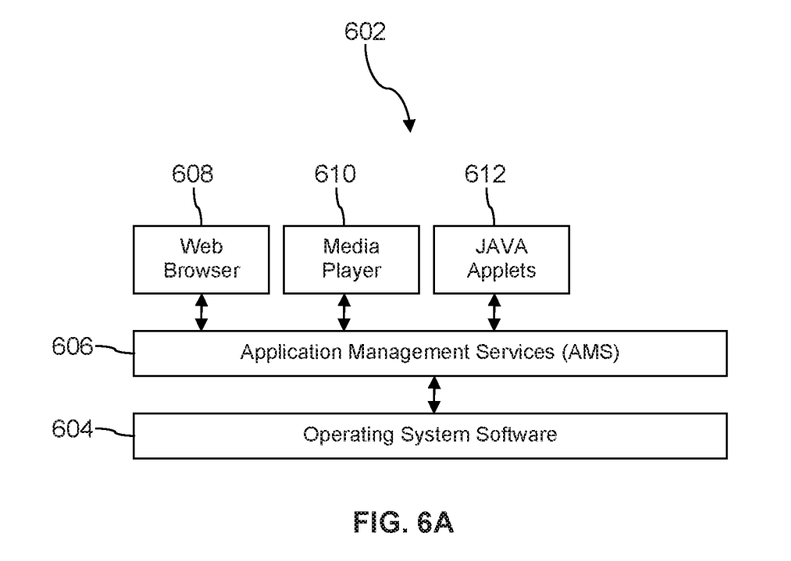
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
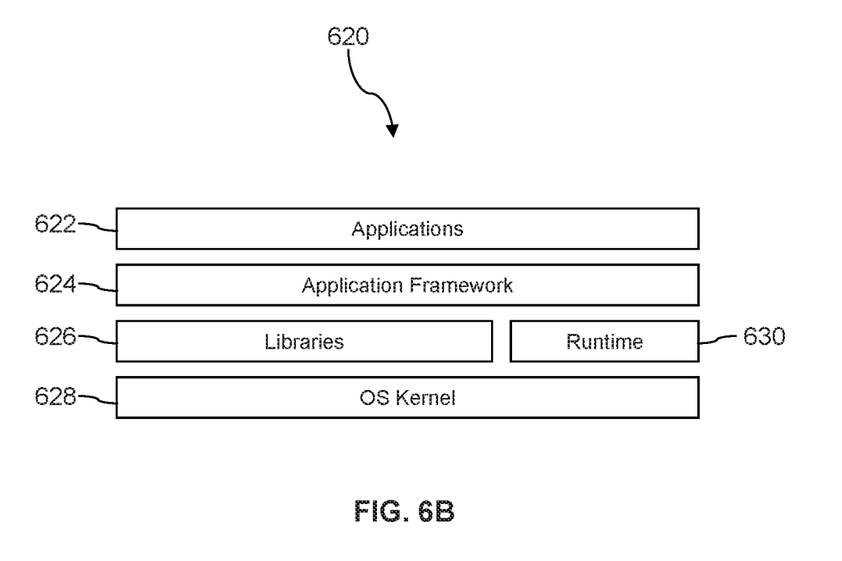
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
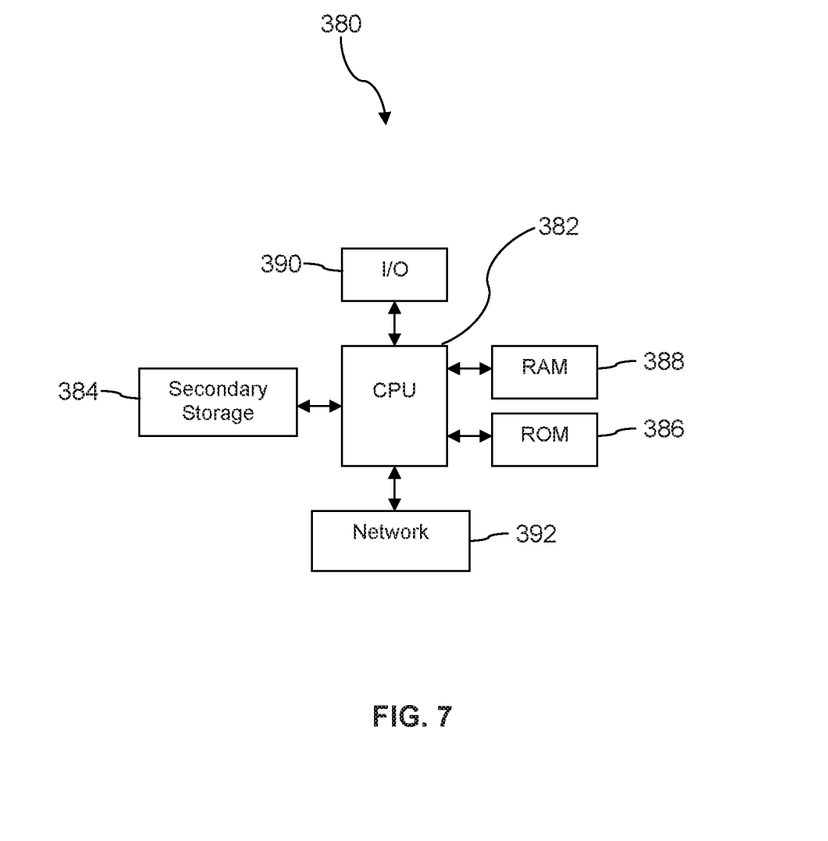
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and/or radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A subscriber identity module (SIM), comprising:
a processor;
a non-transitory memory storing a configuration file and wireless identity access keys; and
a remote update agent stored in the non-transitory memory that, when executed by the processor:
determines that the SIM is communicatively coupled to a wireless communication network via a radio transceiver of a mobile communication device with which the SIM is associated, in response to determining that the SIM is communicatively coupled to the wireless communication network, sends a provide local information (PLI) command to the mobile communication device to acquire network measurement results (NMR) data based on the configuration file, the PLI command sent via a short message service pull operation, transmits the NMR data via the radio transceiver using a bearer independent protocol (BIP), receives SIM update information via the radio transceiver, and stores the SIM update information in the configuration file in the non-transitory memory.

2. The SIM of claim 1, wherein the remote update agent is stored in the non-transitory memory using less than 10,000 bytes of memory.

3. The SIM of claim 1, wherein the NMR data comprises a current signal to noise ratio (SNR) and a radio timing advance.

4. The SIM of claim 3, wherein the remote update agent transmits the NMR data via the radio transceiver as a data blob in a BIP message.

5. The SIM of claim 1, wherein in response to determining that the SIM is not communicatively coupled to a wireless communication network, the remote update agent does not send the PLI command to the mobile communication device to acquire NMR data and does not transmit the NMR data.

6. The SIM of claim 1, wherein the configuration file defines how often the remote update agent transmits NMR data.

7. The SIM of claim 1, wherein the remote update agent transmits current location information about the mobile communication device with the NMR data.

8. The SIM of claim 1, wherein the SIM is removable from the mobile communication device.

9. The SIM of claim 1, wherein the SIM is semi-permanently installed in the mobile communication device.

10. A method of updating a subscriber identity module (SIM) installed in a mobile communication device, comprising:

determining by a remote update agent executing on a SIM that the SIM is communicatively coupled to a wireless communication network via a radio transceiver of a mobile communication device with which the SIM is associated;

in response to determining that the SIM is communicatively coupled to the wireless communication network, sending a short message service (SMS) message by the remote update agent to a server computer to request a remote update of the SIM;

receiving by the remote update agent an updated configuration file from the server computer;

storing the updated configuration file by the remote update agent in a non-transitory memory of the SIM;

sending a provide local information (PLI) command to the mobile communication device to acquire network measurement results (NMR) identified by the updated configuration file; and transmitting the NMR by the remote update agent using a bearer independent protocol (BIP) via a BIP message, where the NMR is packaged in a data field of the BIP message.

11. The method of claim 10, wherein the NMR comprises a current signal to noise ratio (SNR) and a radio timing advance.

12. The method of claim 10, further comprising:

receiving an updated preferred roaming list (PRL) by the remote update agent from the server computer; and storing the updated PRL by the remote update agent in the non-transitory memory of the SIM.

13. The method of claim 12, wherein the remote update agent receives the updated PRL while the mobile communication device is in a roaming network.

14. The method of claim 10, wherein the updated configuration file defines how often the remote update agent transmits NMR data.

15. A subscriber identity module (SIM), comprising:

a processor;

a non-transitory memory storing a configuration file, a wireless identity, and a wireless authentication key; and a remote update agent stored in the non-transitory memory that, when executed by the processor:

determines network measurement results (NMR) based on the configuration file, determines a terminal profile of a communication device with which the SIM is associated, determines location data, packages the NMR, terminal profile, and location data in a data blob, and in response to determining that the SIM is communicatively coupled to a wireless communication network, transmits the data blob via the communication device and the wireless communication network.

16. The SIM of claim 15, wherein the wireless authentication key comprises a Ki authentication key.

17. The SIM of claim 15, wherein the non-transitory memory further stores a preferred roaming list (PRL) and wherein the remote update agent receives an updated PRL and stores the updated PRL in the non-transitory memory.

18. The SIM of claim 15, wherein the SIM is associated with a mobile communication device.

19. The SIM of claim 15, wherein the SIM is associated with an internet of things (IoT) device.

20. The SIM of claim 15, wherein the remote update agent is stored in the non-transitory memory using less than 10,000 bytes of memory.

* * * * *